United States Patent
Dentzer

(10) Patent No.: US 8,209,302 B2
(45) Date of Patent: Jun. 26, 2012

(54) SYSTEMS AND METHODS FOR PROCESSING DATA OBJECTS

(75) Inventor: Ralf Georg Friedrich Dentzer, Hockenheim (DE)

(73) Assignee: SAP AG, Walldorf (DE)

( * ) Notice: Subject to any disclaimer, the term of this patent is extended or adjusted under 35 U.S.C. 154(b) by 249 days.

(21) Appl. No.: 12/414,857

(22) Filed: Mar. 31, 2009

(65) Prior Publication Data

US 2010/0250505 A1 Sep. 30, 2010

(51) Int. Cl.
*G06F 17/00* (2006.01)
(52) U.S. Cl. .................................. 707/690; 707/608
(58) Field of Classification Search .................. 707/690, 707/695, 608
See application file for complete search history.

(56) References Cited

U.S. PATENT DOCUMENTS

| | | | | |
|---|---|---|---|---|
| 5,680,573 | A * | 10/1997 | Rubin et al. | 711/129 |
| 6,782,387 | B1 * | 8/2004 | Kumashio | 707/608 |
| 7,296,025 | B2 * | 11/2007 | Kung et al. | 707/608 |
| 7,334,095 | B1 * | 2/2008 | Fair et al. | 711/161 |
| 7,398,281 | B2 * | 7/2008 | Atchison et al. | 707/608 |
| 7,409,511 | B2 * | 8/2008 | Edwards et al. | 711/161 |
| 7,689,567 | B2 * | 3/2010 | Lock et al. | 707/999.01 |
| 7,987,217 | B2 * | 7/2011 | Long et al. | 707/826 |
| 2002/0028656 | A1 * | 3/2002 | Yemini et al. | 455/41 |
| 2003/0120873 | A1 * | 6/2003 | Kanaley | 711/141 |
| 2003/0140028 | A1 * | 7/2003 | Sjogren et al. | 707/1 |
| 2003/0200197 | A1 * | 10/2003 | Long et al. | 707/1 |
| 2003/0208490 | A1 * | 11/2003 | Larrea et al. | 707/9 |
| 2005/0027651 | A1 * | 2/2005 | DeVault | 705/38 |
| 2005/0097149 | A1 * | 5/2005 | Vaitzblit et al. | 707/202 |
| 2005/0108481 | A1 * | 5/2005 | Iyengar et al. | 711/141 |
| 2006/0235871 | A1 * | 10/2006 | Trainor et al. | 707/102 |
| 2008/0163252 | A1 * | 7/2008 | Lock et al. | 719/315 |
| 2010/0250506 | A1 * | 9/2010 | Dentzer | 707/703 |

* cited by examiner

*Primary Examiner* — Shahid Alam
*Assistant Examiner* — Muluemebet Gurmu
(74) *Attorney, Agent, or Firm* — Kenyon & Kenyon LLP

(57) ABSTRACT

A system and method for processing data objects is provided. The system and method may comprise: a data object database for storing data objects, a transaction document database for storing transaction documents, a fast data provider module configured to provide, upon request from a user interface module, data objects to the user interface module; a user transaction provider module configured to read changed data objects from the user interface module, read data objects from the fast data provider module, and store changed data objects in a user transaction document; and a business transaction provider module to read changed data objects from the user transaction document and perform updates of the changed data objects based on the user transaction document.

11 Claims, 4 Drawing Sheets

SYSTEMS AND METHODS FOR PROCESSING DATA OBJECTS

TECHNICAL FIELD

The technical field of the present invention is in the area of electronic data processing. More particularly, the invention relates to methods, computer programs, products and systems including architecture for large scale business applications, such as an enterprise resource planning (ERP) application.

BACKGROUND

Several recent trends impact classical business computing application architectures. For example, rich user interfaces require provision of comprehensive refined business information at PC response times while large enterprises are integrating and streamlining separate business systems into one comprehensive instance to consolidate information and reduce computing costs. At the same time, application service providers want to offer these business systems through hosted, on demand business solutions to a maximum number of users while minimizing the need for computing systems to keep operating costs low. However, the increasing amounts of information needed to fulfill business and compliance requirements necessitates high performance computer systems. Further, the integration of different application areas, such as financial, sales, purchasing, production, projects or human resources, into consolidated computing systems have increases complexity.

Accordingly, there is a need in the art to efficiently process data to keep operating costs low.

BRIEF DESCRIPTION OF THE DRAWINGS

The accompanying drawings, which are incorporated in and constitute a part of this specification, illustrate embodiments of the invention and, together with the description, explain elements of the invention. In the drawings.

DESCRIPTION OF THE EMBODIMENTS

Figure 1:
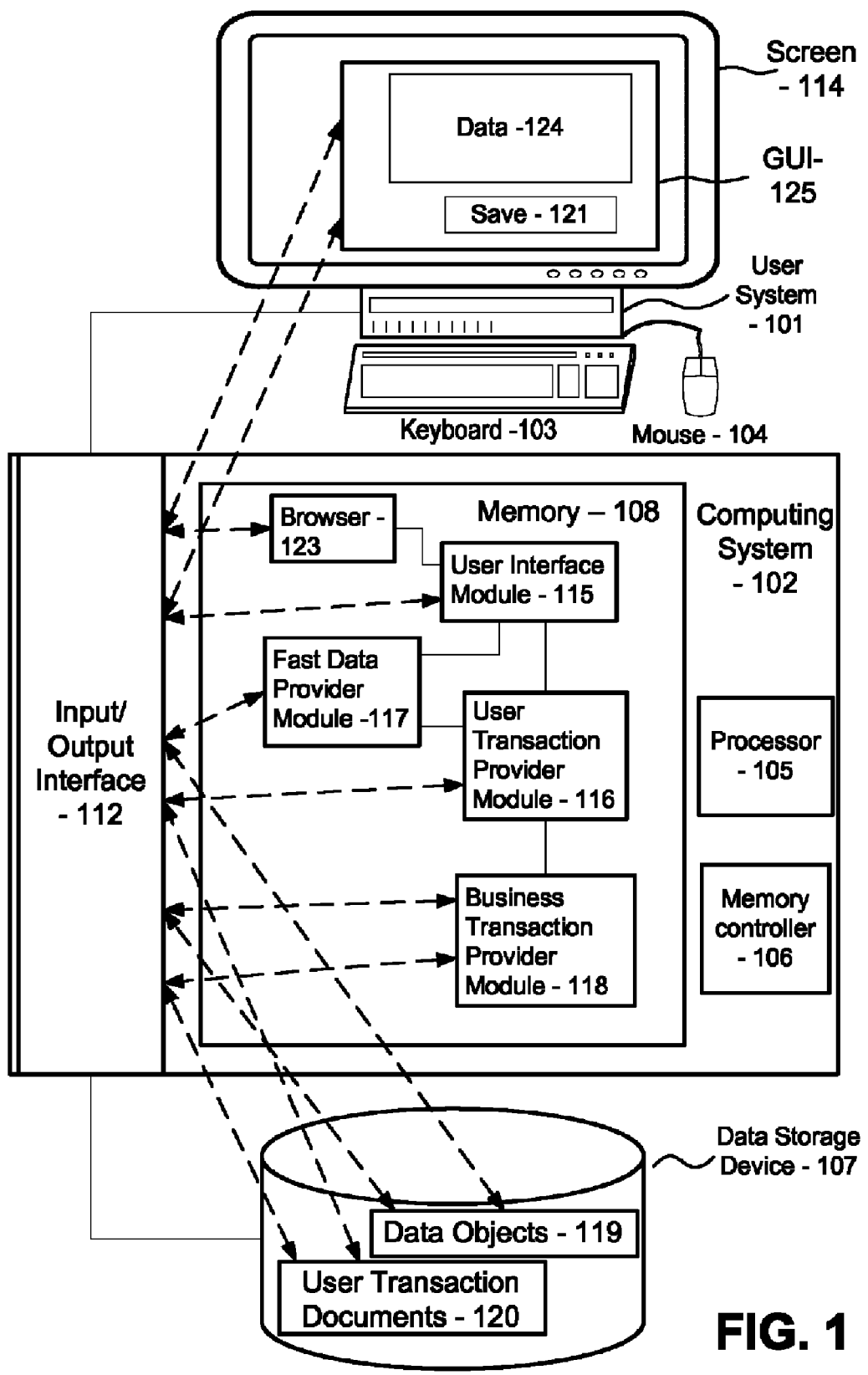
FIG. 1 is a block diagram for illustrating a first implementation of an exemplary computer system consistent with an embodiment of the invention.

Embodiments of the present invention may provide methods, programs, products and systems including computing architectures for large scale business applications, such as an enterprise resource planning (ERP) application.

In accordance with the principles of the invention, as embodied and broadly described herein, an embodiment of the invention may provide a computer system for processing data objects in a large scale enterprise environment. The system may comprise a first database for storing the data objects and a second database for storing transaction documents. For displaying or changing operations, the system may comprise a user interface module configured for processing the data objects stored in the database. The system may further comprise a fast data provider module designed and configured to provide upon request from the user interface module data objects from the database to the user interface module. The system may also comprise a user transaction provider module (UTP) designed or configured to read amended data objects from the user interface module, read data objects from the fast data provider module, perform consistency checks between the data objects read from the user interface module and the fast data provider module and store changes of the data objects made via the user interface module in a user transaction document. The system further comprises a business transaction provider module configured to read amended data objects from the transaction documents and data objects from the first database. It is further configured to perform consistency checks between the read data objects and to perform updates of the data objects in the first database based on the user transaction documents in the second database.

The modules consistent with the invention may be installed as one or more programs or program modules on different computers or computer systems, and run separately and independently of each other, while in their entirety being capable of performing business transactions in a large enterprise environment or in a "software on demand" environment.

Some of the proposed systems and processes described herein may require, compared to current business applications and systems, less updating operations, which improves response times and performance.

Various embodiments may include and/or exclude different aspects, features and/or advantages, depending on the functionality required in a particular system. Additionally, various embodiments may combine aspects and/or features of other embodiments, where applicable.

It is to be understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

Within the concept of this disclosure, the terms used shall have their usual meaning in the context of the field of data processing unless otherwise defined. For example, a computer system broadly refers to any stand alone computer such as a PC or a laptop or a series of computers connected via a network, e.g. a network within a company, or a series of computers connected via the Internet. Computer systems and programs may be closely related. Similarly, phrases such as "the computer provides," "the program provides or performs specific actions," and "a user performs a specific action" are used to express actions by a computer system that may be controlled by a program or to express that the program or program module may be designed to enable the computer system to perform the specific action or to enable a user to perform the specific action by means of a computer system.

The term "data object" broadly refers to any data in a database, which is identified by a key. A data object may be implemented by one or more lines of one or more tables. Data objects are for example used to represent real world entities. In ERP applications they are used to represent business entities such as company, employee, bank account, purchase order and the like.

The term "process" shall be interpreted broadly. This means that the term is intended to refer not only to a plurality of actions or commands of program modules or the like, but also to a single action or command.

The term "user interface provider module" (UIP) broadly refers to a set of instructions which enable presenting a graphical user interface (GUI) on a screen to a user for displaying and changing data associated with a data object in data fields. In an embodiment, the user interface provider module is capable of displaying any data that it reads from the fast data provider module. It is also designed to allow updating operations by means of a user transaction document via the user transaction provider module.

The term "user transaction document" (UTD) broadly refers to a document in which data relating to a business object that is, for example, entered by the user via the graphical user interface, is stored for further processing by a business transaction provider module. Such data may be stored as a complete and amended business object. Alternatively, only amended data may be stored together with a reference, such as an ID or link, to the business object in the database. The user transaction document may also serve as a voucher for an amendment. Further implementations may be readily available to one of ordinary skill.

The term "fast data provider module" (FDP) broadly refers to a memory and set of instructions enabling the fast retrieval of single or multiple data objects. The fast retrieval may be enabled by means of caching or replication mechanisms. It may also be capable of handling large volumes of data objects as a basis to implement user-friendly operations like searching, extracting, aggregating, or summarizing data.

The term "business transaction provider module" (BTP) broadly refers to a set of instructions which allow processing of user transaction documents including transactionally persisting the amended data objects in the database. The BTP may be implemented to handle data updating operations, create a user transaction document for an updating operation, perform business validations using data from the fast data provider, facilitate changes and corrections to a transient user transaction document, persist the user transaction document, and/or initiate processing of the user transaction document by the business transaction provider.

The business transaction provider module may be further configured to perform business validations for a user transaction document based on the latest data objects, perform transactional changes of data objects specified by a user transaction document, reject a user transaction document if there are inconsistencies, persist updated data objects, and/or designate a user transaction document as processed, rejected, or in error. The business transaction provider module may be further configured to administer data objects and/or manage overall consistency.

In some installations, the business transaction provider module may be a bottleneck and user interface provider module and fast data provider module may work with copies of the data objects and provide capabilities for interacting with the user. In other embodiments, the business transaction provider module, user interface provider module and fast data provider module may be distributed over a plurality of computers/servers, thereby enabling a scaling of the system.

The term "transactional" means that a data object and related data objects are only stored or updated in the database in their entirety, or if this is not possible, e.g. because one of the plurality of its tables is locked, not at all.

The described modules and other embodiments of the invention may be implemented by means of a computer system containing software which allows the creation of business software applications and which allows the use of databases or database applications and Internet applications.

In an embodiment of the invention, data objects are stored in a relational database system. In a further embodiment, said storing may be performed transactionally.

Reference will now be made in detail to principles and exemplary embodiments of the invention by an explanation on the basis of a data processing process, examples of which are illustrated in the accompanying drawings. Therein, features with reference signs having the last two ciphers in common, correspond to each other.

Referring now to FIG. 1, an exemplary computer system is illustrated that comprises a user system 101 attached to a screen 114, keyboard 103, and mouse 104; a computing system 102; and, data storage 107. Those skilled in the art will appreciate that methods, systems and computer programs consistent with the present invention apply equally to any computer system, regardless of whether the computer system is a complicated multi-user computing apparatus or a single user device such as a personal computer or workstation. In the embodiment of FIG. 1, computing system 102 comprises a processor 105, a memory 108, a memory controller 106, and an input/output interface 112, all of which are interconnected via a system bus. Note that various modifications, additions, or deletions may be made to computer system 102 and user system 101 illustrated in FIG. 1 such as the addition of cache memory or other peripheral devices. Hence, FIG. 1 is presented to simply illustrate some of the salient features of the depicted system.

Processor 105 may perform computation and control functions of computing system 102, and comprises a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may execute computer programs, such as object-oriented computer programs, within memory 108.

Input/output interface 112 may contain an auxiliary storage interface allowing computer system 102 to store and retrieve information from auxiliary storage devices, such as a magnetic disk (e.g., hard disks or floppy diskettes) or optical storage devices (e.g., CD-ROM). One suitable storage device is a direct access storage device (DASD) 107. As shown in FIG. 1, data storage device 107 may comprise a hard disk drive which may read programs and data from a hard disk.

Memory controller 106, through use of a processor may be responsible for moving requested information from memory 108 and/or through input/output interface 112 to processor 105. While for the purposes of explanation, memory controller 106 is shown as a separate entity, in practice, portions of the function provided by memory controller 106 may actually reside in the circuitry associated with processor 105, memory 108, and/or input/output interface 112.

A terminal interface may be included as part of input/output interface 112 to allow system administrators, computer programmers or other end users to communicate with computing system 102, through, for example, screen 114, keyboard 103, mouse 104, and the like or through programmable workstations.

Input/output interface 112 may allow computer system 102 via processor 105 to communicate with a network for sending and/or receiving data, e.g. for a network connection with one or more further computer systems 111, or for sending or receiving of data to or from other computers. In one embodiment, a plurality of computing systems like computing system 102 can be connected to the same network via each system's input/output interface 112. In such a case, the networked computers can be used as further input/output means, including being used as further storage locations.

In an embodiment, memory 108 includes an operating system and an application, such as an enterprise resource planning application, which application includes a user interface provider module 115 for generating a document, such as a HTTP web page, which represents a graphical user interface 125. The document may be presented to a user as a graphical user interface (GUI) 125 by means of a browser 123. In other words, user interface provider module 115 may communicate with browser 123 using conventional techniques. GUI 125 may comprise one or more data fields 124 for displaying and/or editing data and a save button 121, which may be activated e.g. via mouse arrow 122.

Memory 108 may further include a user transaction provider module 116, a fast data provider module 117 and a business transaction provider module 118. Fast data provider module 117 may access data objects 119, user transaction provider module 116 may access user transaction documents 120, and business transaction provider module 118 may access both data objects 119 and user transaction documents 120, as indicated by the broken arrows. Data objects 119 and user transaction documents 120 may be stored on a direct access data storage device 107, which may include a commercially available database system. User interface provider module 115 may be configured to exchange messages and data with user transaction provider module 116 and fast data provider module 117. User transaction provider module 116 may be configured to exchange messages and data with user interface provider module 115, fast data provider module 117 and business transaction provider module 118, as indicated by the solid lines between the modules.

It should be understood that memory 108 comprises "memory" in its broadest sense, and can include, for example, Dynamic Random Access Memory (DRAM), Static RAM (SRAM), flash memory, cache memory, and other types of known memory. While not explicitly shown in FIG. 1, memory 108 may be a single type of memory component or may be composed of different types of memory components. For example, memory 108 and processor 105 may be distributed across several different computing systems that collectively comprise the system shown in FIG. 1. Further, it should also be understood that programs in memory 108 can include any and all forms of computer programs, including source code, intermediate code, machine code, and any other representation of a computer program. In different embodiments, data objects 119 and/or user transaction documents 120 may also be stored or buffered in a memory like memory 108.

Figure 2:
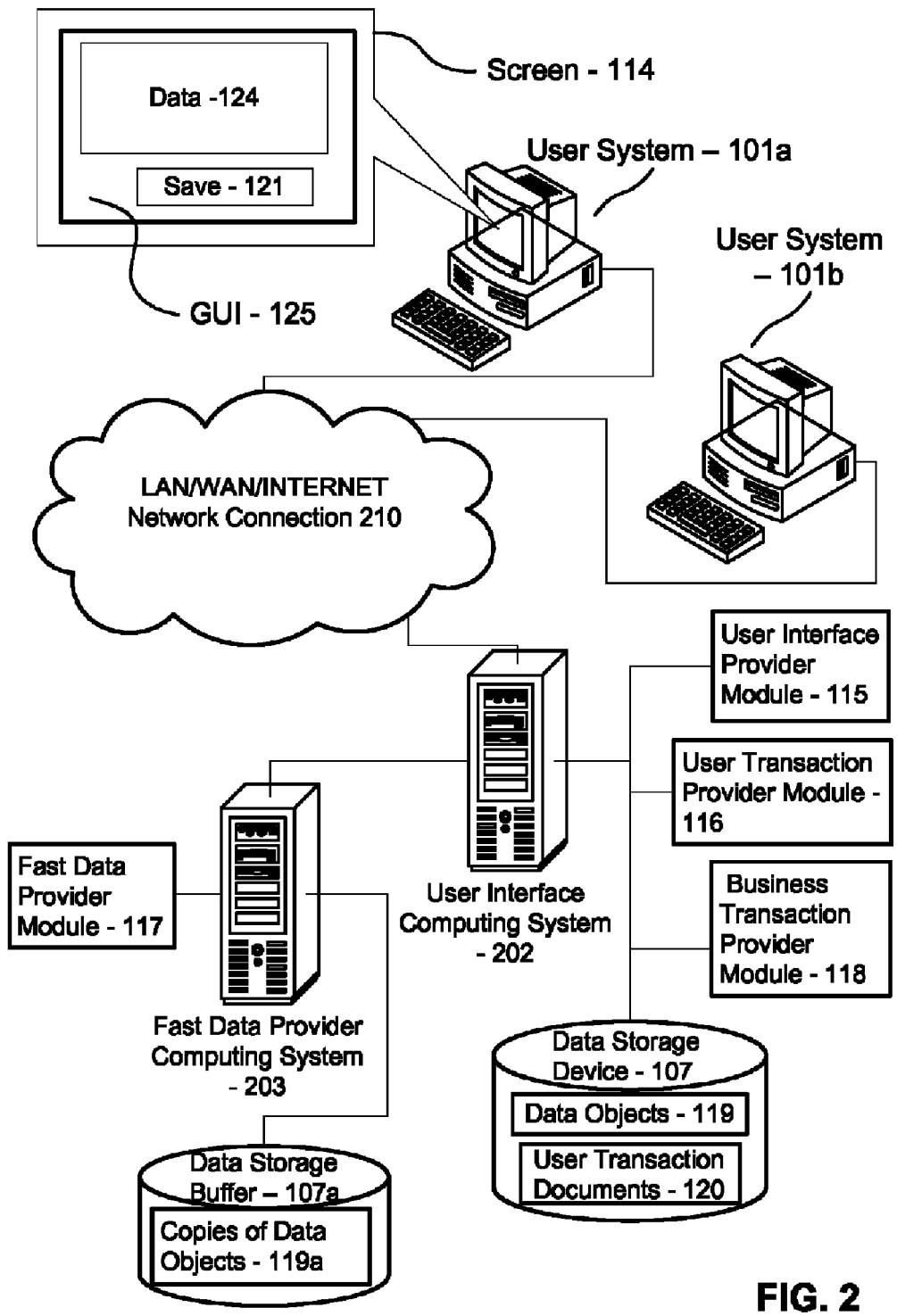
FIG. 2 is a block diagram for illustrating a second implementation of an exemplary computer system consistent with an embodiment of the invention.

Referring now to FIG. 2, a further embodiment of the invention is illustrated by way of a block diagram of an exemplary computer network. In the embodiment shown in this figure, the network comprises two or more user systems, user systems 101a and 101b, interconnected by a network connection 210, which may be a LAN, a WAN, the Internet, or a combination thereof. User systems 101a and 101b may include an application, such as browser 123, and may be used by different users for inputting data. Fast data provider computing system 203 may be implemented as a server and may include fast data provider module 117 and buffer 107a in which copies 119a of data objects 119 are stored and updated from data storage device 107 as may be appropriate. User interface computing system 202 may be implemented as a server and may include user interface provider module 115, user transaction provider module 116, business transaction provider module 118 and direct access data storage device 107 on which user transaction documents 120 and data objects 119 are stored, which may be in a relational database system.

Figure 3:
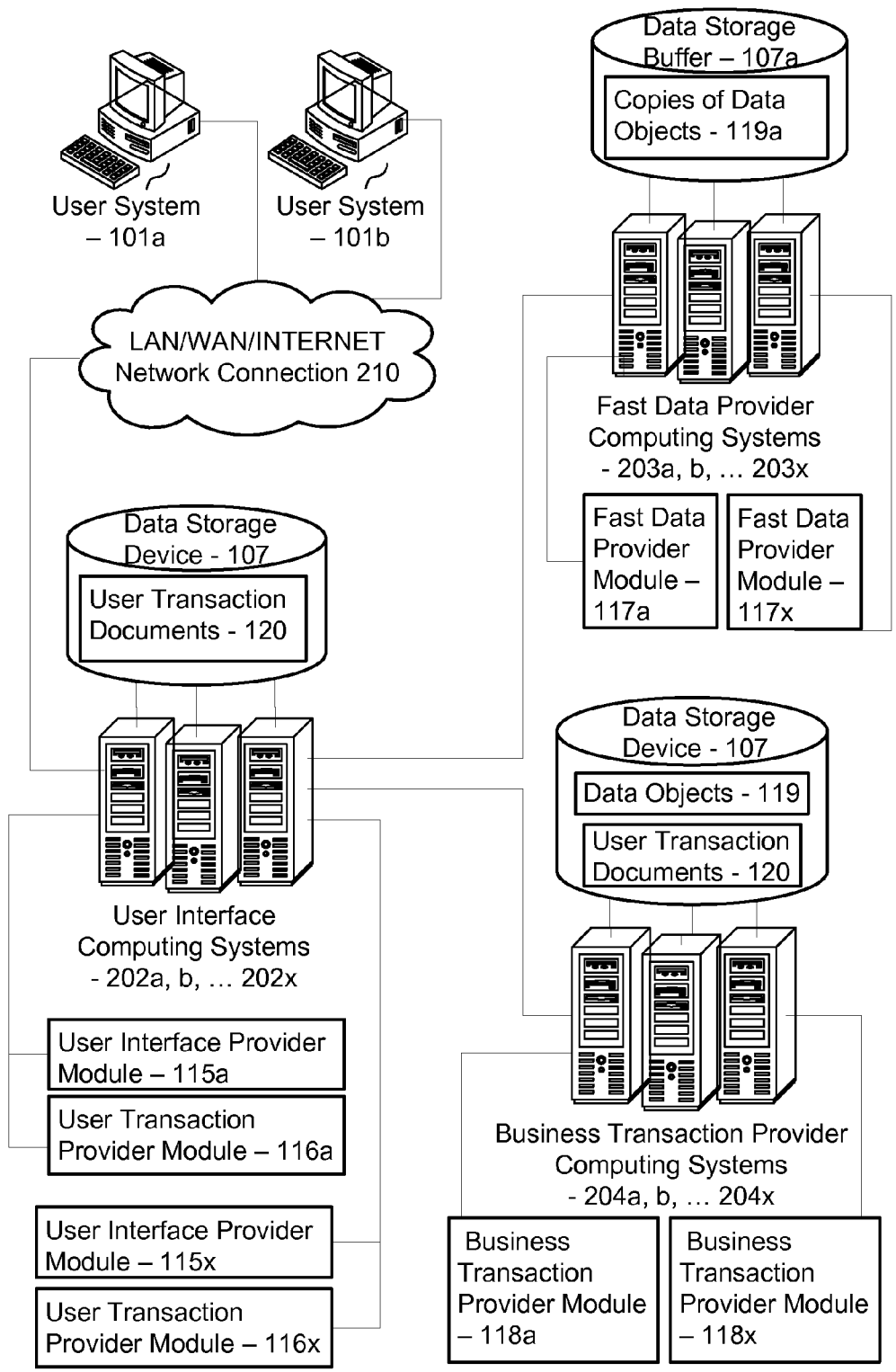
FIG. 3 is a block diagram for illustrating a third implementation of an exemplary computer system consistent with an embodiment of the invention.

FIG. 3 shows a further preferred computer network according to the principles of the invention. In this figure, a plurality of fast data provider modules 117a to 117x may be implemented on a plurality of fast data provider computing systems 203a to 203x, which may be connected to copies of data objects 119a through data storage buffer 107a. A plurality of user interface provider modules 115a to 115x and user transaction provider modules 116a to 116x may be implemented respectively on a plurality of user interface computing systems 202a to 202x, which may be connected to user transaction documents 120 on storage device 107. In other embodiments not shown, user interface provider modules 115a to 115x may be implemented on separate computing systems from user transaction provider modules 116a to 116x. A plurality of business transaction provider modules 118a to 118x may be implemented on a plurality of business transaction provider computing systems 204a to 204x, which may be connected to data objects 119 and user transaction documents 120 through data storage device 107. The user interface computing systems 202a to 202x may communicate with the fast data provider computing systems 203a to 203x and the business transaction provider computing systems 204a to 204x.

Figure 4:
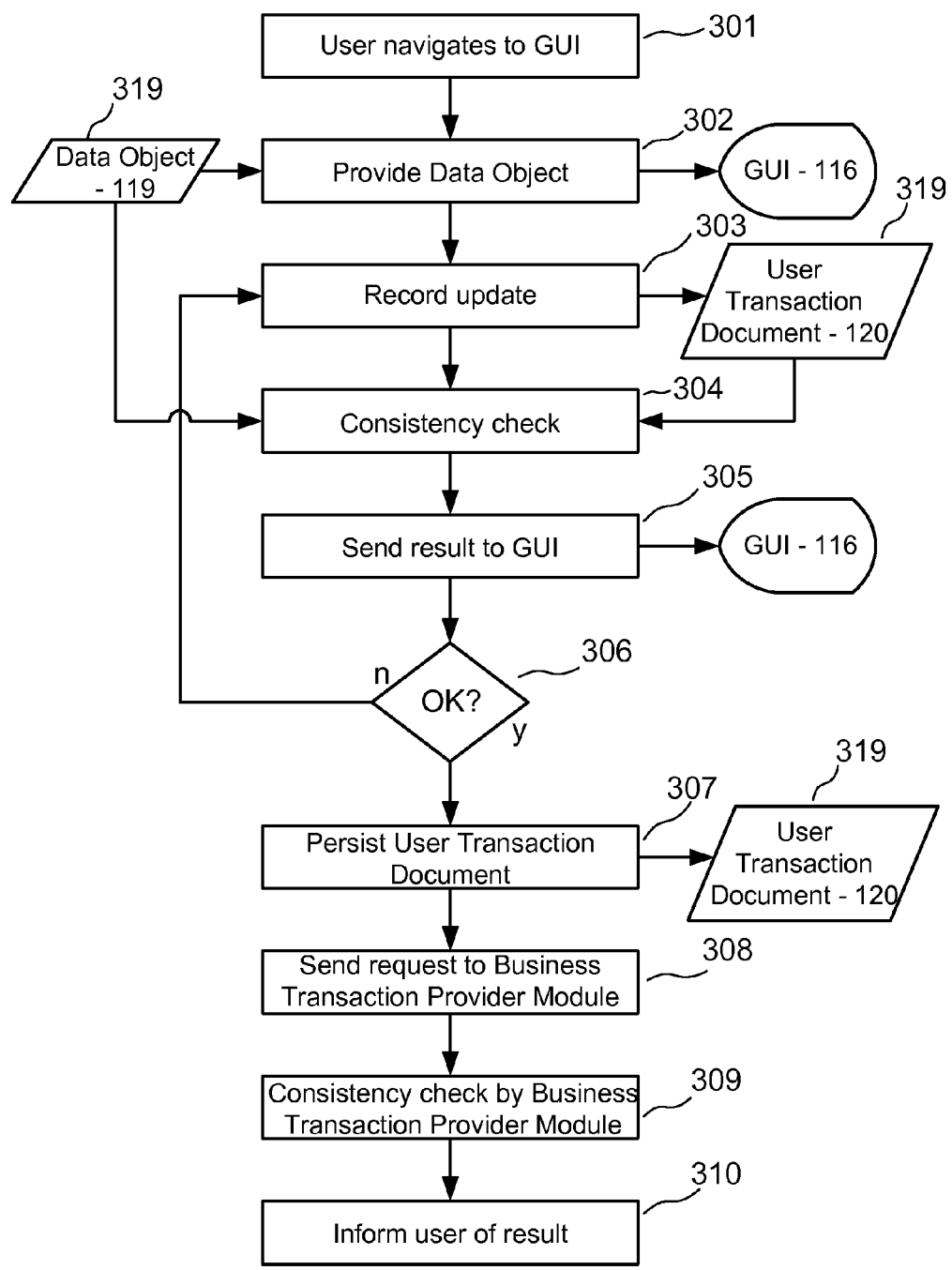
FIG. 4 is a flow diagram for illustrating a process consistent with an embodiment of the invention.

Referring now to FIG. 4, a further embodiment of the invention is illustrated by way of a flow diagram. In a step 301, a user may navigate to a graphical user interface (GUI) 125 provided by the user interface provider module 115 on user systems 101, 101a, or 101b.

In step 302, fast data provider module 117 may retrieve data object 119 from a database on storage device 107 when requested by user interface provider module 115. The fast data provider module 117 may provide the data object 119 to user interface provider module 115, which then may display the data object 119 on the screen 114 through the GUI 125. The data object 119 may also be buffered by fast data provider module 117. The user interface provider module 115 may enable data relating to data object 119 to be entered or updated through GUI 125.

In step 303, data relating to data object 119 that is entered, changed, deleted or otherwise updated may be recorded in a user transaction document 120 that is administered by user transaction provider module 116.

In step 304, user transaction provider module 116 may perform a consistency check between the original data object 119 and the updated data object 119 by comparing buffered data object 119 from fast data provider module 117 to the user transaction document 120.

In step 305, user transaction provider module 116 may send the result back to user interface provider module 115, which then notifies the user through GUI 125. The user then may decide to make changes to the data if the check gives the result "not OK" in step 306 by returning to step 303.

If the consistency check is OK, the user may request to save the update in step 307 and the user transaction provider module 116 may persist the user transaction document 120 in storage device 107.

In step 308, user transaction provider module 116 may send a processing request for user transaction document 120 to the business transaction provider module 118. Such processing request may be sent synchronous or asynchronous at predefinable intervals. Alternatively, business transaction provider module 118 may check at predefinable intervals whether a new or updated user transaction document 120 exists. When a new or updated user transaction document 120 exists, the business transaction provider module 118 may then process the new or updated user transaction document 120.

In step 309, business transaction provider module 118 may perform a further consistency check, if needed or desired, between user transaction document 120 and data object 119. If no errors occur, business transaction provider module 118 may transactionally update data object 119 in data storage device 107 and set the user transaction document 120 to successfully processed.

In step 310, user transaction provider module may check user transaction document 120 to identify whether it has been successfully processed, and thereafter may inform user interface provider module 115 accordingly. User interface provider module 115 may then present a corresponding message to the user via GUI 125. In a further step, buffer 107a of fast data provider module 117 may also be updated with the data in storage device 107.

To enhance performance and the user experience, all data, with the exception of step 309, may be read via fast data provider module 117 and all updating operations may be persisted by creating or modifying user transaction document 120. Furthermore, the complexity involved in step 309 may be hidden from the user so that the user can continue with other work and does not have to wait until step 309 is finished. Hiding the complexity of step 309 from the user may enhance the user experience because this step may take time to complete; for example, due to complex processing logic involving updates to several affected data objects, such as with financial account postings, or due to computer network exchanges, as shown in FIG. 3.

In some embodiments, the business transaction provider module may run into errors when performing a consistency check during step 309. To deal with temporary error situations a certain number of retries may be made. But in case of repeated failure, the business transaction provider module 118 may set the user transaction document to rejected/in error. Such user transaction documents may be presented to the user by user interface provider module 115 through GUI 125. The user then may either confirm the error, thereby causing user transaction document 120 to be cancelled or the user may create a follow-up user transaction document 120 with adjusted updates to circumvent the error; in that case the original user transaction document 120 is marked as cancelled as well.

In various embodiments, the fast data provider module 117 and user transaction provider module 116 may be configured to focus on fast data provisioning and user support independent of transactional integrity considerations. To achieve this, a great variety of techniques can be applied, ranging from main memory caches to load distribution across a plurality of relatively independent machines. Performance may also be improved when the fast data provider module, transaction provider module, and user interface module are decoupled to enable optimization of each module without impairing the functionality of the other modules.

In various embodiments, business transaction provider module 118 may be configured to focus on business logic and transactional integrity without the need to support a diversity of user interface requirements, thereby keeping the implementation as lean as possible while efficiently and reliably performing the transactional steps.

Note that while embodiments of the present invention are described in the context of a fully functional computer system, those skilled in the art will appreciate that modules of the present invention are capable of being distributed as a computer program product in a variety of forms, and that embodiments of the present invention apply equally regardless of the particular type of signal bearing media to actually carry out the distribution. Further examples of signal bearing media include: recordable type media such as floppy disks and CD ROMS, and transmission type media such as digital and analog communication links, including wireless communication links.

Modifications and adaptations of the present invention will be apparent to those skilled in the art from consideration of the specification and practice of the embodiments and features disclosed herein. The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Further, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer system for processing a data object comprising:
   a data object database for storing the data object;
   a transaction document database for storing a user transaction document;
   a user interface module configured for processing an amendment to the data object;
   a fast data provider module configured to provide the user interface module upon request with a cached copy of the data object;
   a user transaction provider module configured to read the amended data object from the user interface module, temporarily record the amendment in the user transaction document, read the cached copy of the data object from the fast data provider module, and compare the user transaction document to the cached copy;
   a business transaction provider module configured to compare the portion of the data object that is amended to a corresponding data object from the data object database to perform a consistency check;

a processing device to execute the configurations of each of the modules; and a memory component to store the data object database and transaction document database, wherein the user transaction provider module and the business transaction provider module sequentially execute a pair of consistency checks, including:

the user transaction provider module first comparing an original portion of the data object that is amended in the user transaction document to a corresponding portion of the data object read by means of the fast data provider module for consistency; and the business transaction provider module second comparing the original portion of the data object that is amended to a corresponding data object from the data object database for consistency; wherein if the first comparison is consistent, the user transaction provider module persistently stores the user transaction document as non-successfully processed in the transaction document database;

if the second comparison is consistent, the business transaction provider module updates the data object in the data object database on the basis of the transaction document using the processing device and sets the user transaction document persistently stored in the transaction document database to successfully processed; and if either comparison is inconsistent, the computer system aborts the amending of the read data object.

2. The computer system of claim 1, wherein the data object database is a relational database.

3. The computer system of claim 1, wherein the fast data provider module includes a caching and a replication mechanism.

4. The computer system of claim 1, wherein the data objects are transactionally stored in the data object database.

5. The computer system of claim 1, wherein the fast data provider module is implemented on a first server in a network and includes a buffer comprising copies of the data objects from the data object database.

6. The computer system of claim 5, wherein the user interface provider module, user transaction provider module, and business transaction provider module are implemented on a second server.

7. The computer system of claim 1, wherein a plurality of fast data provider modules are implemented on a plurality of servers.

8. A computerized method for processing a data object comprising:

sending via a user interface module a request for the data object to a fast data provider module;

based on said request, reading, by means of the fast data provider module the data object from a data object database;

sending the read data object to the user interface module;

amending said read data object via the user interface module using a processing device;

temporarily recording the amending in a user transaction document; and sequentially executing a pair of consistency checks, including:

first, comparing an original portion of the data object that is amended in the user transaction document to a corresponding portion of the data object read by means of the fast data provider module for consistency; and second, comparing the original portion of the data object that is amended to a corresponding data object from the data object database for consistency; wherein if the first comparison is consistent, persistently storing the user transaction document as non-successfully processed in the transaction document database;

if the second comparison is consistent, updating the data object in the data object database on the basis of the transaction document using the processing device and setting the user transaction document persistently stored in the transaction document database to successfully processed; and if either comparison is inconsistent, aborting the amending of the read data object.

9. The method of claim 8, wherein updating the data object in the data object database is performed transactionally.

10. An article of manufacture comprising a non-transitory computer usable medium having a computer readable instruction embodied therein, said computer readable instruction adapted to be executed to implement a method for processing data objects, said method comprising:

sending via a user interface module a request for a data object to a fast data provider module;

responsive to said request, reading by means of the fast data provider module the requested data object from a data object database;

sending the read data object to the user interface module;

amending said read data object via the user interface module using a processing device;

temporarily recording the amending in a user transaction document; and sequentially executing a pair of consistency checks, including:

first comparing an original portion of the data object that is amended in the user transaction document to a corresponding portion of the data object read by means of the fast data provider module for consistency; and second, comparing the original portion of the data object that is amended to a corresponding data object from the data object database for consistency; wherein if the first comparison is consistent, persistently storing the user transaction document as non-successfully processed in the transaction document database;

if the second comparison is consistent, updating the data object in the data object database based on the user transaction document and setting the user transaction document persistently stored in the transaction document database to successfully processed; and if either comparison is inconsistent, aborting the amending of the read data object.

11. The article of manufacture of claim 10, wherein the storing of the amended data is performed transactionally.

* * * * *